Nov. 24, 1931.　　　F. H. LEWIS　　　1,833,165

CHAIN FASTENER

Filed March 5, 1931

INVENTOR
Fred H. Lewis,
By Archworth Martin,
Attorney.

Patented Nov. 24, 1931

1,833,165

UNITED STATES PATENT OFFICE

FRED H. LEWIS, OF YORK, PENNSYLVANIA, ASSIGNOR, BY MESNE ASSIGNMENTS, TO THE McKAY COMPANY, OF PITTSBURGH, PENNSYLVANIA

CHAIN FASTENER

Application filed March 5, 1931. Serial No. 520,203.

My invention relates to chain fasteners, and more particularly to a fastener for detachably connecting chain links.

While my invention is hereinafter described as employed more particularly in connection with tire chains, it will be understood that it is useful also in various other relations.

One object of my invention is to provide a chain fastener, that while it may be readily manipulated to open and close the same, it is securely held against opening accidentally.

Another object of my invention is to provide a chain fastener of generally simplified and improved form.

Figure 1:
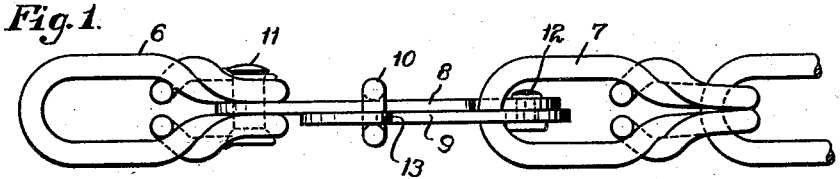
Figure 2:
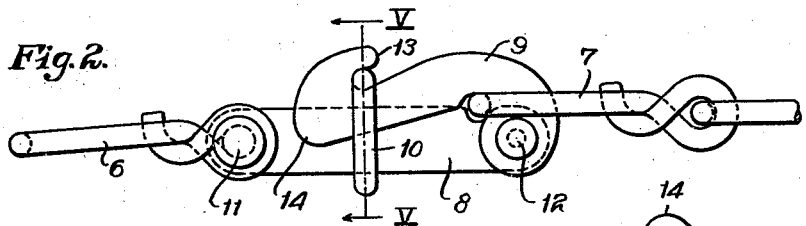
Figure 3:
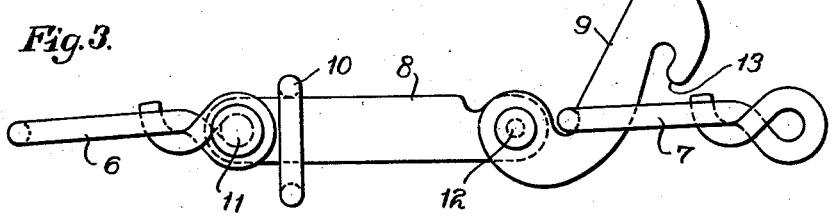
Figure 4:
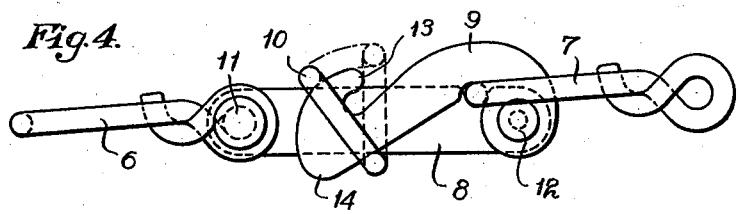

One form which my invention may take is shown in the accompanying drawings, wherein Figure 1 is a plan view of the structure; Fig. 2 is a side elevational view; Fig. 3 is a view similar to Fig. 2, but showing the fastener in opened position; Fig. 4 shows the manner in which the keeper may be moved to engage or release the latching lever, and Fig. 5 is a view taken on the line V—V of Fig. 2.

The fastener is shown as detachably connecting links 6 and 7, which may be the end links of a side chain of a tire chain structure.

The fastener comprises a connector bar 8, a latch lever 9, and a keeper 10. The connector bar 8 is pivotally joined to the link 6 by a rivet 11, and the latch lever 9 is connected to the bar 8 by a pivot member 12. The connector bar and the latch lever have semi-circular recesses that serve as a seat for the link 7, as shown more clearly in Fig. 2. The free end of the lever 9 is of hook form, such hook having a nose portion 13 and a heel portion 14 that lie on a line diagonal to the body portion of the lever.

Figure 5:
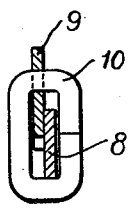

The keeper 13 is of yoke-like or flattened loop form as shown more clearly in Fig. 5. The longer internal diameter of the keeper is of less length than the distance between the portions 13 and 14 of the hook, so that it cannot be disengaged from the hook except by a tilting movement from the position shown in dotted lines in Fig. 4, to the full-line position thereof. In other words, the distance between the points 13 and 14 of the hook is such that the keeper cannot be disengaged therefrom simply by depressing the latch lever 9 somewhat from the position shown in Fig. 1, and sliding the keeper along the bar 8 to the position shown in Fig. 3, but the keeper has to be tilted to approximately a certain angle, as shown in Fig. 4, before it can be slid to released position. A reverse movement of the keeper will, of course, bring it to operative position, as in Fig. 2.

I claim as my invention:—

1. A chain fastener comprising a connector bar, a latch lever pivotally connected at one of its ends to said bar and having its other end turned backwardly to form a hook, a keeper of loop-like form slidably supported on the bar, the sides of the keeper being spaced apart a sufficient distance to receive the lever member and the connector bar member when said members are in side by side relation and the longer internal diameter of the keeper being less than the distance between the nose and heel portions of the hook.

2. A chain fastener comprising a connector bar, a keeper slidably supported on said bar, a latch lever pivotally connected at one of its ends to the said bar and having a backwardly-turned hook portion disposed on lines diagonal to the body portion of the lever, the dimension of said hook portion along said diagonal lines being greater than the internal diameter of the keeper, and the greatest dimension of such hook portion along lines perpendicular to the body portion of the lever being less than the said internal diameter.

3. A chain fastener comprising a connector bar of flat stock, a keeper carried thereby, a latch lever of flat stock pivotally connected at one of its ends to the connector bar and having an outwardly and backwardly-turned hook portion on its other end, the distance between the outermost point of the hook and the innermost point of the lever at said end being greater than the internal dimension of the keeper, and the said points lying on a line diagonal to the connector bar when the lever is in closed position.

4. A chain fastener comprising a connector bar, a latch lever pivotally connected to the bar and having a hook, a keeper slidably supported on the bar for movement into and out of engagement with the said hook, and means preventing movement of said keeper to inoperative position when the keeper is disposed in a plane perpendicular to the plane of the bar.

5. A chain fastener comprising a connector bar of flat stock, a latch lever of flat stock pivotally connected to the bar against one side thereof, a keeper of elongated loop form slidably supported on said bar, the greater internal diameter of the keeper being of sufficient length relative to the width of the bar to permit tilting of the keeper to an angle of approximately 45°, and the keeper being of a width to embrace the bar and the lever when they are in side by side relation, and a backwardly-turned hook portion on the lever, the lever extending beyond the outermost edge of the hook portion a distance greater than the said longer diameter of the keeper.

In testimony whereof I, the said FRED H. LEWIS, have hereunto set my hand.

FRED H. LEWIS.